United States Patent [19]

Chao et al.

[11] Patent Number: 5,128,300
[45] Date of Patent: Jul. 7, 1992

[54] REFORMING CATALYST WITH HOMOGENEOUS METALS DISPERSION

[75] Inventors: Tai-Hsiang Chao, Mt. Prospect; William M. Targos, Palatine; Mark D. Moser, Elk Grove Village, all of Ill.

[73] Assignee: UOP, Des Plaines, Ill.

[21] Appl. No.: 765,653

[22] Filed: Sep. 25, 1991

Related U.S. Application Data

[60] Continuation of Ser. No. 542,501, Jun. 25, 1990, abandoned, which is a division of Ser. No. 374,384, Jun. 30, 1989, Pat. No. 4,964,975.

[51] Int. Cl.$^5$ .................. B01J 21/04; B01J 23/62
[52] U.S. Cl. ........................................... 502/227
[58] Field of Search .................................. 502/227

[56] References Cited

U.S. PATENT DOCUMENTS

| Re. 29,198 | 5/1977 | Itoh et al. | 502/227 X |
| 3,725,304 | 4/1973 | Wilheim | 502/227 |
| 3,745,112 | 7/1973 | Rausch | 502/227 X |
| 3,764,557 | 10/1973 | Kluksdahl | 208/139 X |
| 4,020,012 | 4/1977 | Miura et al. | 502/227 |

Primary Examiner—W. J. Shine
Assistant Examiner—Douglas J. McGinty
Attorney, Agent, or Firm—Thomas K. McBride; John F. Spears, Jr.; Richard E. Conser

[57] ABSTRACT

A novel extruded catalyst and process use thereof is disclosed. The catalyst comprises a refractory inorganic oxide and halogen, platinum-group metal, and Group IVA(14) metal components, wherein the Group IVA(14) metal is homogeneously dispersed within a bed of catalyst particles relative to catalysts of the prior art. Utilization of this catalyst in the reforming of hydrocarbons results in significantly improved selectivity to the desired gasoline product.

1 Claim, 4 Drawing Sheets

Standard Deviation Of Metals Content
2.1 mm. Diameter Catalyst

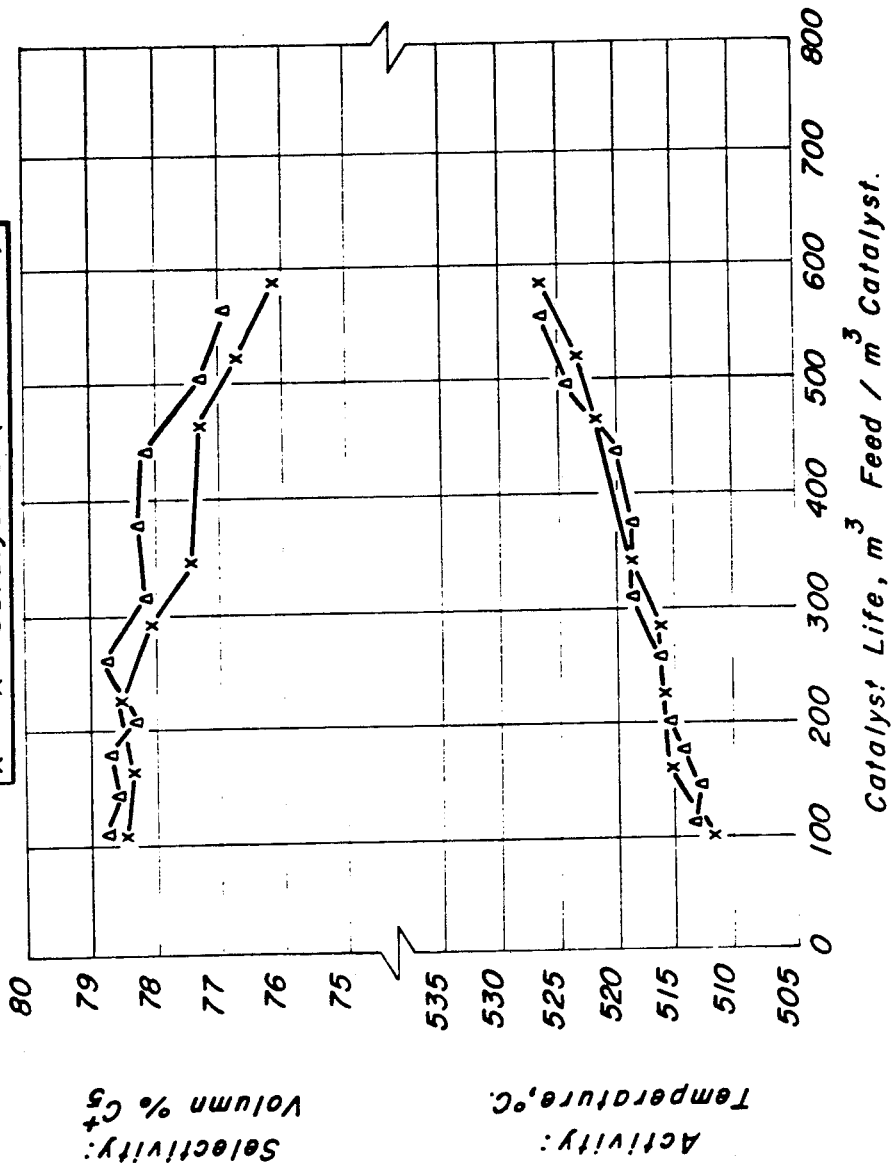

REFORMING CATALYST WITH HOMOGENEOUS METALS DISPERSION

This application is a continuation of prior copending application Ser. No. 542,501, filed Jun. 25, 1990, and incorporated herein by reference, which in turn is a division of Ser. No. 07/374,384, filed Jun. 30, 1989, now U.S. Pat. No. 4,964,975.

FIELD OF THE INVENTION

This invention relates to an improved catalyst for the conversion of hydrocarbons, and more specifically for the catalytic reforming of gasoline-range hydrocarbons.

BACKGROUND OF THE INVENTION

The subject of the present invention is a novel catalyst with homogenous metals dispersion which features exceptional selectivity to desired products when employed in a hydrocarbon conversion process requiring a catalyst having both a hydrogenation-dehydrogenation function and a cracking function. More precisely, the present invention involves a novel dual-function catalyst characterized by low standard deviation of the local concentration of a Group IVA(14) metals component relative to the bulk concentration in a bed of catalyst particles which surprisingly enables substantial improvements in hydrocarbon conversion processes that have traditionally used a dual-function catalyst. Metals of Group IVA (IUPAC 14) of the Periodic Table [See Cotton and Wilkinson, Advanced Inorganic Chemistry, John Wiley and Sons (Fifth Edition, 1988)] having utility in the present invention are one or more of tin, germanium and lead.

In another aspect, the present invention comprehends improved processes that emanate from the use of the novel catalyst. In a specific aspect, an improved reforming process utilizes the subject catalyst to increase selectivity to gasoline and aromatics products. In an alternative aspect, the present catalyst is employed in a process for the dehydrogenation of dehydrogenatable hydrocarbons.

Catalysts having a hydrogenation-dehydrogenation function and a cracking function are used widely in many applications, particularly in the petroleum and petrochemical industry, to accelerate a wide spectrum of hydrocarbon-conversion reactions. The cracking function generally is thought to be associated with an acid-action material of the porous, adsorptive, refractory-oxide type which is typically utilized as the support or carrier for a heavy-metal component, such as the Group VIII(8-10) metals, to which is generally attributed the hydrogenation-dehydrogenation function.

These catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and other reactions to products an octane-rich or aromatic-rich product stream. Another example is an isomerization process wherein a hydrocarbon fraction which is relatively rich in straight-chain paraffin compounds is contacted with a dual-function catalyst to produce an output stream rich in isoparaffin compounds while converting any cyclics present to a mixture of paraffins and naphthenes by a combination of hydrogenation and ring opening. Yet another example is a hydrocracking process wherein catalysts of this type are utilized to effect selective hydrogenation and cracking of high molecular weight unsaturated materials, selective hydrocracking of high molecular weight compounds, and other reactions to produce a generally lower-boiling, more valuable output stream.

Regardless of the reactions or the particular process involved, it is of critical importance that the dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

(1) Activity is a measure of the ability of the catalyst to convert hydrocarbon reactants to products at a designated severity level, with severity level representing a combination of reaction conditions: temperature, pressure, contact time, and hydrogen partial pressure. Activity typically is designated as the octane number of the pentanes and heavier ("$C_5+$") product stream from a given feedstock at a given severity level, or conversely as the temperature required to achieve a given octane number.

(2) Selectivity refers to the percentage yield of petrochemical aromatics or $C_5+$ gasoline product from a given feedstock at a particular activity level.

(3) Stability refers to the rate of change of activity or selectivity per unit of time or of feedstock processed. Activity stability generally is measured as the rate of change of operating temperature per unit of time or of feedstock to achieve a given $C_5+$ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Programs to improve reforming-catalyst performance are being stimulated by the widespread removal of lead antiknock additive from gasoline and by the increasing requirements of high-performance internal-combustion engines, which magnify the requirement for gasoline "octane" or knock resistance of the gasoline component. The catalytic reforming unit must operate at higher severity in order to meet these increased octane needs. This higher severity results in lower yield of gasoline product, and catalyst selectivity becomes even more important to avoid excessive losses of valuable product to fuel by-product. The major problem facing workers in this area of the art, therefore, is to develop more selective catalysts with sufficient activity and stability to operate effectively at current high reforming severities.

INFORMATION DISCLOSURE

The prior art is replete with references to catalysts containing a Group IVA(14) metal component and a platinum-group-metal component. For example, U.S. Pat. No. 3,700,588 (Weisang et al.) teaches a catalyst comprising platinum and tin or lead on alumina, wherein the alumina is pretreated with hydrogen chloride and the tin is on the surface of the support. U.S. Pat. No. 3,702,294 (Rausch) discloses a catalytic composite containing platinum, tin and halogen components; Rausch discloses the incorporation of the tin in the composite by all conventional methods, with preferred methods being impregnation of the tin or incorporation of the tin in alumina hydrosol followed by oil dropping. U.S. Pat. No. 3,764,557 (Kluksdahl) teaches a process for reactivating a catalyst comprising platinum and tin suitably impregnated to be uniformly disposed on the surface of the carrier. U.S. Pat. No. 3,775,301 (Hayes) discloses a catalytic reforming process characterized by a catalytic composite comprising platinum-group, germanium and rhenium; germanium is incorporated in the composite in any suitable manner, with impregnation or addition to alumina hydrosol followed by oil dropping being preferred. U.S. Pat. No. 4,032,475 (Knapik et al.) teaches a catalytic composite containing a platinum-group metal, tin and cobalt with a uniform distribution of the tin and platinum. U.S. Pat. No. 4,588,497 (Blanchard et al.) disclose a reforming process characterized by a catalyst comprising Group VIII(-8-10) and additional metals, including tin, lead, and germanium, introduced preferentially into the binding agent or alumina charge. Applicants assert that the above patents do not provide the extruded catalyst of the present invention, wherein the homogeneous dispersion of Group IVA(14) metal is distinguished by a low standard deviation of concentration in a bed of catalyst particles.

"Uniformly distributed" is contrasted with "surface-impregnated" metal component in U.S. Pat. No. 4,791,087 (Moser et al.). Platinum and Group IVA(14) metal components are uniformly dispersed, while the surface-impregnated metal component is selected from rhodium, ruthenium, cobalt, nickel, and iridium and has a concentration in the defined exterior surface at least 4 times greater than in the interior portion. "Uniformly distributed" thus refers to the absence of a concentration gradient between the exterior surface and the interior portion of a catalyst particle, in contrast to the homogeneous dispersion with low standard within a bed of catalyst particles.

Silver grains are described as very uniformly deposited in U.S. Pat. No. 4,690,913 (Nojiri et al.) when the loading of silver on the innermost layer of catalyst is 0.65 times (preferably 0.7 times) the loading on the outside surface layer. Nojiri et al. does not describe a Group IVA(14) component. Considering the range of metals loadings of Nojiri et al., differences in "very uniformly deposited" silver loadings could range from 65 to about 150% which would be substantially more than variations characterized by the present invention.

U.S. Pat. No. 4,169,040 (Bea et al.) teaches a heavy-oil conversion process characterized by a catalyst having standard deviation of less than 25% in concentrations of silica and various Group VIB and Group VIII(-8-10) metals. Nickel, cobalt, molybdenum, tungsten and compounds thereof are disclosed. Bea et al. do not disclose a catalyst having a homogeneous Group IVA(14) metal component nor the advantages of using such catalyst in hydrocarbon conversion.

The prior art thus teaches catalysts having platinum-group and Group IVA(14) metal components and also discloses that, in aspects that differ from the present invention, the distribution of the metals on a catalyst can affect its utility. However, the prior art relates to the presence or absence of a concentration gradient of Group IVA(14) metal within a catalyst particle rather than homogeneous dispersion within a bed of catalyst particles. Applicants believe that the art does not disclose or anticipate the extruded catalyst of the present invention, wherein the homogeneous dispersion of a Group IVA(14) metal component in a bed of catalyst particles provides surprising improvements in selectivity.

SUMMARY OF THE INVENTION

Objects

It is an object of the invention to provide a novel catalyst for improved selectivity in hydrocarbon conversion. A corollary object of the invention is to provide a hydrocarbon-conversion process, particularly a reforming process showing improved selectivity to gasoline or aromatics product.

Summary

This invention is based on the discovery that an extruded catalyst containing a homogeneously dispersed Group IVA(14) metal component and a platinum-group metal component in a bed of catalyst particles shows exceptional selectivity for hydrocarbon conversion.

Embodiments

A broad embodiment of the present invention is a bed of extruded catalyst particles comprising a refractory inorganic oxide, a halogen, a platinum-group metal and a Group IVA(14) metal having a local concentration in a bed of catalyst particles with a standard deviation of less than 25% of the bulk concentration. In a preferred embodiment the refractory inorganic oxide is alumina, the platinum-group metal is platinum, and the Group IVA(14) metal is tin.

In an especially preferred embodiment, the standard deviation of the Group IVA(14) metal concentration is determined by scanning transmission electron microscopy.

In another aspect, the invention is a preferred process for the reforming of hydrocarbons utilizing the present catalyst to achieve improved gasoline or aromatic yields. An alternative embodiment is a dehydrogenation process employing the present catalyst for greater selectivity to desired olefinic products.

These as well as other objects and embodiments will become evident from the following more detailed description of the present invention.

BRIEF DESCRIPTION OF THE DRAWINGS

FIGS. 2 and 4 compare reforming selectivity and activity for the catalysts of the prior art and of the present invention respectively characterized in FIGS. 1 and 3. $C_{5}+$ product yields and temperature requirement for 98 RON clear product are shown as a function of catalyst life for each catalyst.

DESCRIPTION OF THE PREFERRED EMBODIMENTS

Figure 1:
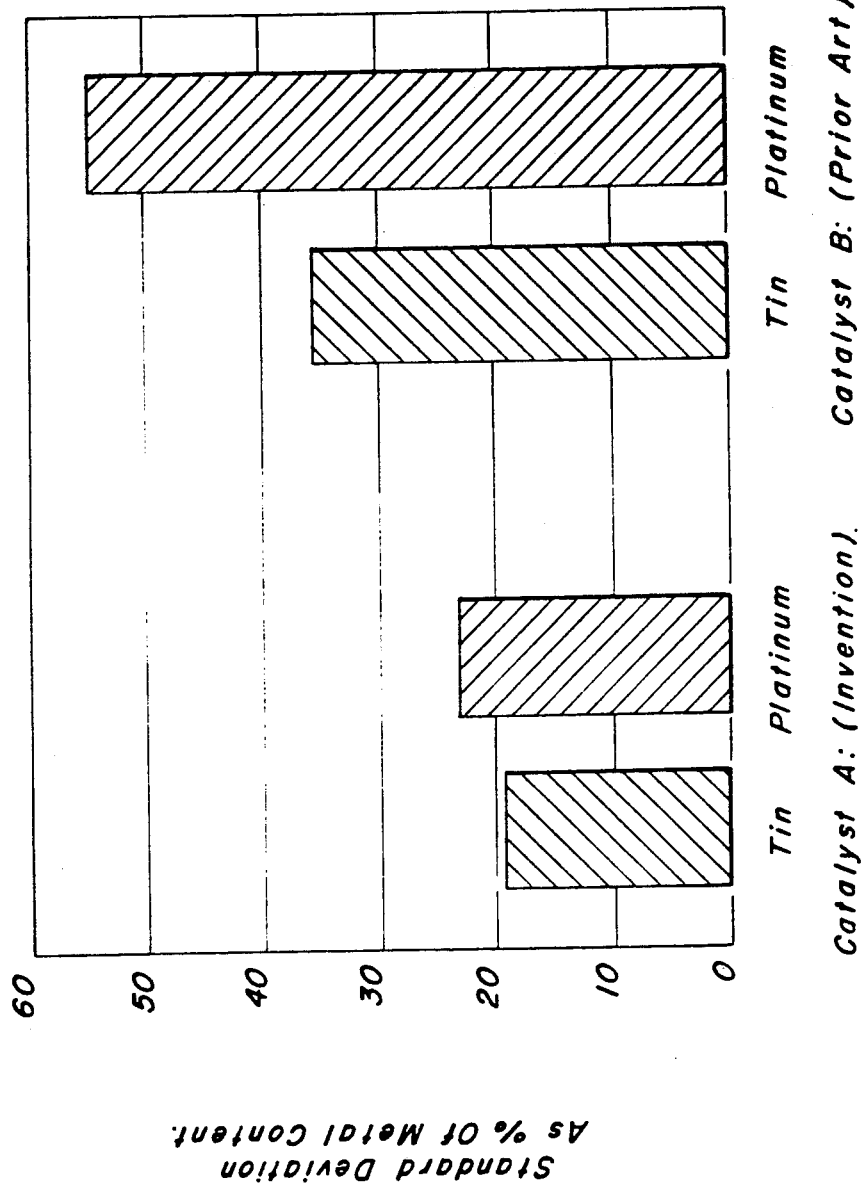
FIGS. 1 and 3 show the standard deviations of tin and platinum concentrations for 2.1 and 1.6 mm diameter catalysts, respectively, by scanning transmission election microscopy. The metals dispersion of a control catalyst of the prior art is contrasted to the dispersion of a catalyst of the invention.

To reiterate briefly, a broad embodiment of the present invention is a bed of extruded catalyst particles comprising a refractory inorganic-oxide support, a halogen component, a platinum-group-metal component, and a Group IVA(14) metal having a local concentration in a bed of catalyst particles with a standard deviation of less than 25% of the bulk concentration.

The invention is characterized for a bed of catalyst particles, such as would be contained in a reaction vessel in a process unit for hydrocarbon conversion. The "bed of catalyst particles" is defined as an aggregate of extruded catalyst particles manufactured by substantially identical procedures in identical equipment from the same batches of raw materials. The catalyst particle of the present invention is an extrudate, preferably cylindrical in shape and having a diameter of about 0.8 to 3.2 mm (especially 1.5 to 2.2 mm) and a length to diameter ratio of about 1:1 to 5:1, with 2:1 being especially preferred.

The dispersion of metals on a sample of catalyst particles from the bed preferably is determined by scanning transmission electron microscopy. The scanning transmission electron microscope (STEM) combines technologies of the transmission electron microscope, for high resolution, and the scanning electron microscope, for imaging and chemical microanalysis. The catalyst particle is ground to a fine powder with a mortar and pestle, granules of the fine powder having a typical range of dimensions through the center of the granule of about 1000 to 5000 angstroms. An area on a granule of up to about 500 angstroms in diameter is examined by STEM to determine the local concentration of metals.

The standard deviation of the local concentration of a metal in a bed of catalyst particles is calculated based on STEM determinations of local concentration on at least three, and preferably ten or more, samples from the bed. Samples are selected from the bed by techniques known to those of ordinary skill in the art and preferably examined by STEM as described hereinabove. The average and standard deviation of local concentration of metal are calculated from the individual measurements. The average metal content of the bed of catalyst particles also may be determined by other methods known in the art, and would be expected to approximate the average of local concentration in conformance with the standard deviation. "Bulk concentration" of metal, as used hereinafter, is characterized as the greater of the average of individual measurements of local concentration and the average concentration as determined by other methods known in the art. Homogeneous dispersion is defined as the ratio of the standard deviation to the bulk concentration of metal.

Considering the refractory support utilized in the present invention, it is preferred that the material be a porous, adsorptive, high-surface area support having a surface area of about 25 to about 500 m$^2$/g. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as: (1) refractory inorganic oxides such as alumina, titanium dioxide, zirconium dioxide, chromium oxide, zinc oxide, magnesia, thoria, boria, silicaalumina, silica-magnesia, chromia-alumina, alumina-boria, silica-zirconia, etc.; (2) ceramics, porcelain, bauxite; (3) silica or silica gel, silicon carbide, clays and silicates including those synthetically prepared and naturally occurring, which may or may not be acid treated, for example attapulgus clay, diatomaceous earth, fuller's earth, kaolin, kieselguhr, etc.; (4) crystalline zeolitic aluminosilicates, such as X-zeolite, Y-zeolite, mordenite, or L-zeolite, either in the hydrogen form or most preferably in nonacidic form with one or more alkali metals occupying the cationic exchangeable sites; (5) non-zeolitic molecular sieves, such as aluminophosphates or silico-aluminophosphates; and (6) combinations of one or more elements from one or more of these groups.

The preferred refractory inorganic oxide for use in the present invention is alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 m$^2$/g.

Although alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely high purity pseudoboehmite which, after calcination at a high temperature, has been shown to yield a high purity gamma-alumina.

This alumina powder can be formed into any desired shape or type of carrier material known to those skilled in the art such as spheres, rods, pills, pellets, tablets, granules, extrudates, and like forms by methods well known to the practitioners of the catalyst material forming art. The preferred type of carrier material for the present invention is a cylindrical extrudate, preferably prepared by mixing the alumina powder with water and suitable peptizing agents until an extrudable dough is formed. The amount of water added to form the dough is typically sufficient to give a loss on ignition (LOI) at 500° C. of about 45 to 65 mass %, with a value of 55 mass % being preferred. The acid addition rate is generally sufficient to provide 2 to 7 mass % of the volatile-free alumina powder used in the mix, with a value of 3 to 4 mass % being preferred.

In an especially preferred embodiment, the alumina powder is peptized with hydrochloric acid. Excellent results are obtained when the Group IVA(14) metal component is added as the chloride along with hydrogen chloride during the peptization step. Without limiting the invention, it is believed that the use of hydrochloric acid avoids subsequent hydrolysis of metal chloride during incorporation of the essential Group IVA(14) metal component into the catalyst composite. The resulting metal oxide polymer could result in localized concentration of the metal component, preventing the homogenized dispersion of the Group metal according to the present invention. Aluminum chloride or ammonium chloride are added during the mixing of the peptized alumina dough in an alternative embodiment.

The resulting dough is extruded through a suitably sized die to form extrudate particles. These particles are then dried at a temperature of about 260° to about 427° C. for a period of about 0.1 to 5 hours to form the preferred extrudate particles of the Ziegler alumina refractory inorganic oxide. It is preferred that the refractory inorganic oxide comprise substantially pure Ziegler alumina having an apparent bulk density of about 0.6 to about 1 g/cc and a surface area of about 150 to 280 m$^2$/g (preferably 185 to 235 m$^2$/g, at a pore volume of 0.3 to 0.8 cc/g).

The homogeneously dispersed Group IVA(14) metal component is an essential ingredient of the catalyst of the present invention. Of the Group IVA(14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. The Group IVA(14) metal component is preferably utilized in an amount sufficient to result in a final catalytic composite containing about 0.01 to about 5 mass % Group IVA(14) metal, calculated on an elemental basis, with best results obtained at a level of about 0.1 to about 2 mass % metal.

The Group IVA(14) metal component may be incorporated in the catalytic composite in any suitable manner to achieve the homogeneous dispersion of the present invention, such as by coprecipitation with the porous carrier material, ion-exchange with the carrier material or impregnation of the carrier material at any stage in the preparation. One method of incorporating the Group IVA(14) metal component into the catalyst composite involves the utilization of a soluble, decomposable compound of a Group IVA(14) metal to impregnate and disperse the Group IVA(14) metal throughout the porous carrier material. The Group IVA(14) metal component can be impregnated either prior to, simultaneously with, or after the other components are added to the carrier material. Thus, the Group IVA(14) metal component may be added to the carrier material by commingling the latter with an aqueous solution of a suitable Group IVA(14) metal salt or soluble compound of Group IVA(14) metal such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(14) metal chloride compounds, such as stannic chloride; germanium tetrachloride or lead chlorate is particularly preferred since it facilitates the incorporation of both the Group IVA(14) metal component and at least a minor amount of the preferred halogen component in a single step. When combined with hydrogen chloride during the especially preferred alumina peptization step described hereinabove, a homogeneous dispersion of the Group IVA(14) metal component is obtained in accordance with the present invention.

In an alternative embodiment, organic Group IVA(14) metal compounds are utilized to provide the homogeneous Group IVA(14) metal dispersion of the present invention. These organic Group IVA(14) metal compounds may be characterized by the formulas $R_4Y$, $R_3YX$, $R_2YX_2$ and $RYX_3$, wherein R represents an organic compound with from 1 to about 10 carbon atoms, Y represents a Group IVA(14) metal, and X represents halide, hydroxide, or nitrate. Preferred compounds include trimethyltin chloride and dimethyltin dichloride. These organic Group IVA(14) metal compounds are preferably incorporated into the catalyst during the peptization of the inorganic oxide binder, and most preferably during peptization of alumina with hydrogen chloride or nitric acid.

Another essential ingredient of the catalyst is a platinum-group-metal component. This comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective, but relatively small amounts are preferred. In fact, the platinum-group metal generally will comprise about 0.01 to about 2 mass % of the final catalytic composite, calculated on an elemental basis. Excellent results are obtained when the catalyst contains about 0.05 to about 1 mass % of platinum.

The platinum-group metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

In a preferred embodiment, the platinum-group metal is homogeneously dispersed in the catalyst. Homogeneous dispersion of the platunum-group metal is defined as the standard deviation relative to bulk concentration, based preferably upon ten or more determinations of metals concentration by STEM as described hereinabove. Without limiting the invention, it is believed that the homogeneous dispersion of the Group IVA(14) metal component and increased surface area effects homogeneous dispersion of the platinum-group metal.

In an alternative embodiment, the catalyst comprises tin, platinum, and rhenium components. The rhenium component will be sufficient in this embodiment to result in a rhenium content of the finished catalyst of about 0.01 to 5 mass %. The rhenium component preferably is incorporated into the catalytic composite utilizing a soluble, decomposable rhenium compound. Rhenium compounds which may be employed include ammonium perrhenate, sodium perrhenate, potassium perrhenate, potassium rhenium oxychloride, potassium hexachlororhenate (IV), rhenium chloride, rhenium heptoxide, and the like compounds. Best results are obtained when an aqueous solution of perrhenic acid is employed in impregnation of the rhenium component. The platinum and rhenium components may be impregnated by use of separate impregnation solutions or, as is preferred, using a single impregnation solution comprising decomposable platinum and rhenium compounds. If two separate impregnation solutions are utilized in order to composite the platinum component and rhenium component with the refractory inorganic oxide, separate oxidation and reduction steps may be employed between application of the separate impregnation solutions. Additionally, halogen adjustment steps may be employed between application of the separate impregnation solutions. Such halogenation steps will facilitate incorporation of the catalytic components and halogen component into the refractory inorganic oxide.

Indium is an alternative metal promoter of the tin-platinum-rhenium catalyst. The indium is incorporated into the catalyst composite by a second dispersion of an indium component over the first uniform dispersion of platinum component and rhenium component. The phrase "a second dispersion of indium component" describes a second application of indium component over the first dispersion of platinum and rhenium component, contacting the composite with indium in a manner which results in a dispersion thereof throughout the refractory inorganic oxide. At least one oxidation step is required prior to addition of the second dispersion of indium component. The indium component then may be added to the refractory inorganic oxide by commingling the later with an aqueous, acidic solution of suitable indium salt or suitable compound of indium such as indium tribromide, indium perchlorate, indium trichloride, indium trifluoride, indium nitrate, indium sulfate, and the like compounds. A particularly preferred impregnation solution comprises an acidic solution of indium trichloride. The total of the (rhenium+indium) components should comprise, on an elemental basis, from about 0.01 to about 5 mass % of the finished composite.

Optionally the catalyst may also contain other components or mixtures thereof which act alone or in concert as catalyst modifiers to improve activity, selectivity or stability. Some known catalyst modifiers include cobalt, nickel, iron, tungsten, molybdenum, chromium, bismuth, antimony, zinc, cadmium and copper. Catalytically effective amounts of these components may be added in any suitable manner to the carrier material during or after its preparation or to the catalytic composite before, while or after other components are being incorporated.

It is within the scope of the present invention that one or more of the metal components mentioned hereinbefore be a surface-layer component. Preferred surface-layer metal components comprise the platinum-group metals, cobalt, nickel and iridium. A metal component is considered to be a surface-layer component when he average content of the component in the exterior 50% of the exterior volume of the catalyst is at least 4 times the average concentration of the same metal component in the remaining interior portion of the catalyst A catalytic composite comprising a surface-layer metal component is described in U.S. Pat. No. 4,677,094, which is incorporated by reference into this specification.

The surface-layer component may be incorporated into the catalytic composite in any suitable manner which results in the metal component being concentrated in the exterior surface of the catalyst support in the preferred manner. In addition, it may be added at any stage of the preparation of the composite—either during preparation of the carrier material or thereafter—and the precise method of incorporation used is not deemed to be critical so long as the resulting metal component is a surface-layer component as the term is used herein. A preferred way of incorporating this component is an impregnation step wherein the porous carrier material containing homogeneously dispersed Group IVA(14) metal is impregnated with a suitable metal-containing aqueous solution. It is also preferred that no "additional" acid compounds are to be added to the impregnation solution.

An optional component of the catalyst, particularly useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium sodium, and lithium—and the compounds of the alkaline earth metals—calcium, strontium, barium, and magnesium. Generally, good results are obtained in these embodiments when this component constitutes about 0.1 to about 5 mass % of the composite, calculated on an elemental basis. This optional alkali or alkaline earth metal component can be incorporated into the composite in any of the known ways with impregnation with an aqueous solution of a suitable water-soluble, decomposable compound being preferred.

Another optional ingredient of the catalyst of the present invention is a Friedel-Crafts metal halide component. This ingredient is particularly useful in hydrocarbon conversion embodiments of the present invention wherein it is preferred that the catalyst utilized has a strong acid or cracking function associated therewith—for example, an embodiment wherein the hydrocarbons are to be hydrocracked or isomerized with the catalyst of the present invention. Suitable metal halides of the Friedel-Crafts type include aluminum chloride, aluminum bromide, ferric chloride, ferric bromide, zinc chloride, and the like compounds, with the aluminum halides and particularly aluminum chloride ordinarily yielding best results. Generally, this optional ingredient can be incorporated into the composite of the present invention by any of the conventional methods for adding metallic halides of this type and either prior to or after the adsorbed rhenium oxide reagent is added thereto; however, best results are ordinarily obtained when the metallic halide is sublimed onto the surface of the carrier material after rhenium is added thereto according to the preferred method disclosed in U.S. Pat. No. 2,999,074. The component can generally be utilized in any amount which is catalytically effective, with a value selected from the range of about 1 to about 15 mass % of the carrier material generally being preferred. An optional component of the Friedel-Crafts metalhalide-containing composite is a polyhalo selected from the group consisting of methylene halide, haloform, methylhaloform, carbon tetrahalide, sulfur dihalide, thionyl halide, and thiocarbonyl tetrahalide. Suitable polyhalo compounds thus include methylene chloride, chloroform, methylchloroform, carbon tetrachloride, and the like. In any case, the polyhalo compound must contain at least two chlorine atoms attached to the same carbon atom. Carbon tetrachloride is the preferred polyhalo compound.

As heretofore indicated, it is necessary to employ at least one oxidation step in the preparation of the catalyst. The conditions employed to effect the oxidation step are selected to convert substantially all of the metallic components within the catalytic composite to their corresponding oxide form. The oxidation step typically takes place at a temperature of from about 370° to about 600° C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step, a halogen adjustment step may also be employed in preparing the catalyst. As heretofore indicated, the halogen adjustment step may serve a dual function. First, the halogen adjustment step may aid in homogeneous dispersion of the Group IVA(14) metal component and the platinum-group metal component. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from abut 370° to about 600° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass % of the finished composite.

In preparing the catalyst, it is also necessary to employ a reduction step. The reduction step is designed to reduce substantially all of the platinum-group metal component to the corresponding elemental metallic state and to ensure a relatively uniform and finely divided dispersion of this component throughout the refractory inorganic oxide. It is preferred that the reduction step take place in a substantially water-free environment. Preferably, the reducing gas is substantially pure, dry hydrogen (i.e., less than 20 volume ppm water). However, other reducing gases may be employed such as $CO_2$, nitrogen, etc. Typically, the reducing gas is contacted with the oxidized catalytic composite at conditions including a reduction temperature of from about 315° to about 650° C. for a period of time of from about 0.5 to 10 or more hours effective to reduce substantially all of the platinum-group metal component to the elemental metallic state. The reduction step may be performed prior to loading the catalytic composite into the hydrocarbon conversion zone or it may be performed in situ as part of a hydrocarbon conversion process start-up procedure. However, if this latter technique is employed, proper precautions must be taken to predry the hydrocarbon conversion plant to a substantially water-free state and a substantially water-free hydrogen-containing reduction gas should be employed.

The catalytic composite may be beneficially subjected to a presulfiding step designed to incorporate sufficient sulfur to comprise, on an elemental basis, from about 0.05 to about 0.5 mass % of the finished composite. The sulfur component may be incorporated into the catalyst by any known technique. For example, the catalytic composite may be subjected to a treatment which takes place in the presence of hydrogen in a suitable sulfur-containing compound such as hydrogen sulfide, lower molecular weight mercaptans, organic sulfides, disulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 10° up to about 600° C. or more. It is generally a good practice to perform this sulfiding step under substantially water-free conditions.

The catalyst of the present invention has particular utility as a hydrocarbon conversion catalyst. The hydrocarbon which is to be converted is contacted with the catalyst at hydrocarbon conversion conditions, which include a temperature of from 40° to 300° C., a pressure of from atmospheric to 200 atmospheres absolute and liquid hourly space velocities from about 0.1 to 100 hr$^{-1}$.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. The reactants may contact the catalyst in individual reactors in either upflow, downflow, or radial flow fashion, with the radial flow mode being preferred. The catalyst is contained in a fixed-bed system or a moving-bed system with associated continuous catalyst regeneration. The preferred embodiment of the current invention is a fixed-bed system. Alternative approaches to reactivation of deactivated catalyst are well known to those skilled in the art, and include semiregenerative operation in which the entire unit is shut down for catalyst regeneration and reactivation or swing-reactor operation in which an individual reactor is isolated from the system, regenerated and reactivated while the other reactors remain on-stream.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Operating conditions applied in the reforming process of the present invention include a pressure selected within the range of atmospheric to 70 atmospheres (abs), with the preferred pressure being about 3 to 40 atmospheres (abs). Particularly good results are obtained at low pressure, namely a pressure of about 3 to 25 atmospheres (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 10 hr$^{-1}$, with a value in the range of about 1 to about 5 hr$^{-1}$ being preferred.

The hydrocarbon feed stream that is charged to this reforming system will comprise naphthenes and paraffins that boil within the gasoline range. The preferred charge stocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines or partially reformed naphthas. Mixtures of straight-run and cracked gasoline-range naphthas can also be used to advantage. The gasoline-range naphtha charge stock may be a full-boiling gasoline having an initial boiling point of from about 40°-70° C. and an end boiling point within the range of from about 160°-220° C., or may be a selected fraction thereof which generally will be a higher-boiling fraction commonly referred to as a heavy naphtha—for example, a naphtha boiling in the range of 100°-200° C. In some cases, it is also advantageous to charge pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the charge stock. In general, this can be accomplished by careful control of the water present in the charge stock and in the hydrogen stream. The charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the charge stock may be adjusted by suitable stripping operations in a fractionation column or like device. In some cases, a combination of adsorbent drying and distillation drying may be used advantageously to effect almost complete removal of water from the charge stock. Preferably, the charge stock is dried to a level corresponding to less than 20 ppm of H$_2$O equivalent.

It is preferred to maintain the water content of the hydrogen stream entering the hydrocarbon conversion zone at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the hydrocarbon feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B(6), Group II-B(12), and Group VIII(8-10) of the Periodic Table.

One embodiment of the invention involves the process of converting a hydrocarbon charge stock at catalytic dehydrocyclization conditions. In particular, the preferred hydrocarbon charge stock comprises $C_6$-$C_8$ nonaromatic hydrocarbons. Dehydrocyclization conditions include a pressure of from about atmospheric to 40 atmosphere (abs), with the preferred pressure being from about 2 to 15 atmospheres (abs), a temperature of from about 350° to 650° C., and a liquid hourly space velocity of from about 0.1 to about 10 $hr^{-1}$. Preferably, hydrogen may be employed as a diluent. When present, hydrogen may be circulated at a rate of from about 0.2 to about 10 moles of hydrogen per mole of charge stock hydrocarbon.

It is preferred that the charge stock of the alternative dehydrocyclization process embodiment substantially comprises paraffins, as the purpose of a dehydrocyclization process is to convert paraffins to aromatics. Because of the high value of $C_6$-$C_8$ aromatics, it is additionally preferred that the hydrocarbon charge stock comprise $C_6$-$C_8$ paraffins. However, notwithstanding this preference, the hydrocarbon charge stock may comprise naphthenes, aromatics, and olefins in addition to $C_6$-$C_8$ paraffins.

In an alternative embodiment of the invention, dehydrogenatable hydrocarbons are contacted with the catalytic composite of the present invention in a dehydrogenation zone maintained at dehydrogenation conditions. This contacting may be accomplished in a fixed-catalyst bed system, a moving-catalyst-bed system, a fluidized-bed system, etc., or in a batch-type operation. A fixed-bed system is preferred. The hydrocarbon may be contacted with the catalyst bed in either upward, downward or radial-flow fashion. Radial flow of the hydrocarbon through the catalyst bed is preferred for commercial-scale reactors. The hydrocarbon may be in the liquid phase, a mixed vapor-liquid phase or the vapor phase when it contacts the catalyst. Preferably, it is in the vapor phase.

Dehydrogenation conditions include a pressure of from about 0.01 to 10 atmospheres (abs), a temperature of from about 400° to 900° C. and a liquid hourly space velocity of from about 0.1 to 100 $hr^{-1}$. The pressure is maintained as low as practicable, consistent with equipment limitations, to take advantage of chemical equilibrium. Required temperature, for comparable conversion, generally is higher for lower-molecular-weight normal paraffins.

Hydrocarbons which may be dehydrogenated comprise dehydrogenatable hydrocarbons having from 2 to 30 or more carbon atoms including paraffins, alkylaromatics, naphthenes and olefins. One group of hydrocarbons which can be dehydrogenated with the catalyst is the group of normal paraffins having from 2 to 30 or more carbon atoms. The catalyst is particularly useful for dehydrogenating paraffins having from 2 to 25 or more carbon atoms to the corresponding monoolefins or for dehydrogenating monoolefins having from 3 to 15 or more carbon atoms to the corresponding diolefins.

In yet another alternative embodiment of the present invention, an isomerizable hydrocarbon charge stock, preferably in admixture with hydrogen, is contacted with a catalyst of the type hereinbefore described in a hydrocarbon isomerization zone. Contacting may be effected using the catalyst in a fixed-bed system, a moving-bed system, a fluidized-bed system, or in a batch-type operation. In view of the danger of attrition loss of the valuable catalyst and of operational advantages, it is preferred to use a fixed-bed system. The conversion zone may be in a single reactor or in two or more separate reactors with suitable means therebetween to insure that the desired isomerization temperature is maintained at the entrance to each zone. Two or more reactors in sequence are preferred to enable improved isomerization through control of individual reactor temperatures and for partial catalyst replacement without a process shutdown. The reactants may be contacted with the catalyst bed in either upward, downward, or radial flow fashion. The reactants may be in a the liquid phase, a mixed liquid-vapor phase, or a vapor phase when contacted with the catalyst, with excellent results being obtained by application of the present invention to a primarily liquid-phase operation.

Isomerization reactor temperatures will usually range from about 40° to 250° C. Lower reaction temperatures are generally preferred since the equilibrium favors higher concentration of isoalkanes relative to normal alkanes. When the feed mixture is primarily $C_5$ and $C_6$ alkanes temperatures in the range of from about 40° to about 150° C. are preferred. When it is desired to isomerize significant amounts of butanes, higher reaction temperatures in the range from about 145° to 225° C. are required to maintain catalyst activity. Reactor operating pressures generally range from about atmospheric to 100 atmospheres (abs), with preferred pressures in the range of from 20 to 35 atmospheres (abs). Liquid hourly space velocities range from about 0.25 to about 12 volumes of isomerizable hydrocarbon feed per hour per volume of catalyst, with a range of about 0.5 to 5 $hr^{-1}$ being preferred. The mol ratio of hydrogen to hydrocarbon feed is from about 0.01 to 5, with a mol ratio of 0.05 or less being preferred. The isomerization process also requires the presence of a small amount of an organic chloride promoter amounting to from 30 to 300 mass ppm of the combined feed.

Alkanes having 4 to 7 carbon atoms per molecule ($C_4$-$C_7$) are preferred isomerization feedstocks. These may be contained in such streams from petroleum refining or synthetic-fuel production as light straight-run naphtha, light natural gasoline, light reformate, light raffinate from aromatics extraction, light cracked naphtha, normal-butane concentrate, field butanes and the like. An especially preferred feedstock is light straight-run naphtha, containing more than 50% of $C_5$ and $C_6$ paraffins with a high concentration of low-octane normal paraffins; this feedstock is particularly susceptible to octane-number upgrading by isomerization. The light straight-run naphtha and other feedstocks also may contain naphthenes, aromatics, olefins, and hydrocarbons heavier than $C_6$. The olefin content should be limited to a maximum of 10% and the content of hydrocarbons heavier than $C_6$ to 20% for effective control of hydrogen consumption, cracking reactions, heat of reaction and catalyst activity. It is generally known that high-chloride platinum-alumina catalysts of this type are highly sensitive to sulfur- and oxygen-containing compounds. The feedstock therefore must be relatively free of such compounds, with a sulfur concentration generally no greater than 0.5 ppm.

As discussed previously, three parameters are especially useful in evaluating hydrocarbon-conversion process and catalyst performance. "Activity" is a measure of the catalyst's ability to convert reactants at a specified set of reaction condition, specifically temperature in the present embodiment. "Selectivity" is an indication of the catalyst's ability to produce a high yield of the desired product, specifically $C_5+$ reformate in the present embodiment. "Stability" is a measure of the catalyst's ability to maintain its activity and selectivity over time.

The following examples are presented to elucidate the catalyst and process of the present invention, demonstrating selectivity and activity advantages over prior-art technology. These examples are offered as illustrative embodiments and should not be interpreted as limiting the claims.

EXAMPLE I

A first extruded catalyst having a diameter of about 2.1 mm was prepared in order to exemplify the catalyst of the present invention and designated as Catalyst A. Substantially pure pseudoboehmite powder was charged to a continuous mixer in the amount of 1000 grams along with 723 grams of a solution of hydrogen chloride, stannic chloride and aluminum chloride. The resulting dough had a moisture content of about 57%. The dough was mixed for 10 minutes and extruded through a 1/12" die to form cylindrical extrudates. The extrudates were dried for 2 hours and calcined at 610° C. for 2 hours.

The calcined extrudates then were added to an impregnation solution containing chloroplatinic acid and hydrogen chloride sufficient to result in a final composite containing, on an elemental basis, about 0.37% platinum. The impregnation solution was evaporated and the resulting particles were contacted with an air stream containing $H_2O$ and HCl sufficient to adjust the chloride content of the finished catalyst to about 1%. The oxidized and chloride-adjusted particles then were oxidized and reduced in a conventional manner to yield a catalyst having the following approximate composition in mass %:

| | |
|---|---|
| Tin | 0.23 |
| Platinum | 0.37 |
| Chlorine | 1.04 |
| Alumina | Balance |

EXAMPLE II

A control catalyst having a diameter of about 2.1 mm was prepared in order to contrast the prior art with the present invention and designated as Catalyst B. Substantially pure pseudoboehmite powder was charged to a continuous mixer in the amount of 1000 grams along with 670 grams of a solution of nitric acid and stannic chloride. The formation of a precipitate of stannic oxide prior to mixing was noted. The resulting dough has a moisture content of about 57%. The dough was mixed for 10 minutes and extruded through a 1/12" die to form cylindrical extrudates. The extrudates were dried, calcined, subjected to platinum impregnation and chloride adjustment, oxidized and reduced in the manner of Catalyst A to yield a catalyst having the following approximate composition in mass %:

| | |
|---|---|
| Tin | 0.24 |
| Platinum | 0.37 |
| Chlorine | 0.98 |
| Alumina | Balance |

EXAMPLE III

The 2.1 mm Catalysts A and B of the invention and of the prior art, respectively, were examined by STEM to determine the extent of dispersion of the tin and platinum components. The catalysts were ground and a carbon-coated copper grid prewet with isopropanol was dipped in the powder, allowed to dry and inserted into the VG-HB-5 dedicated STEM. Results were as follows:

| | Catalyst A Invention | Catalyst B Prior Art |
|---|---|---|
| Tin: | | |
| Number of readings | 14 | 27 |
| Mean, mass % | 0.21 | 0.33 |
| Standard deviation | 0.04 | 0.12 |
| Platinum: | | |
| Number of readings | 14 | 27 |
| Mean, mass % | 0.35 | 0.38 |
| Standard deviation, mass % | 0.08 | 0.21 |

The comparative results are illustrated in FIG. 1.

EXAMPLE IV

Pilot-plant tests were structured to compare the selectivity and activity of the catalysts of the invention and of the prior art in a reforming process. Two tests were performed on the catalyst of the invention and one on the prior art catalyst. The feedstock for the comparative tests was a hydrotreated petroleum-derived naphtha having the following characteristics:

| | | |
|---|---|---|
| Sp. gr. | | 0.746 |
| ASTM D-86, °C.: | IBP | 85 |
| | 50% | 134 |
| | EP | 194 |
| Mass %: | Paraffins | 64.5 |
| | Naphthenes | 23.0 |
| | Aromatics | 12.5 |

Each test was based on a severity of 98 RON (Research Octane Number) clear $C_5+$ product at a pressure of 17 atmospheres (ga) and a liquid hourly space velocity of 2.5 $hr^{-1}$.

Figure 2:
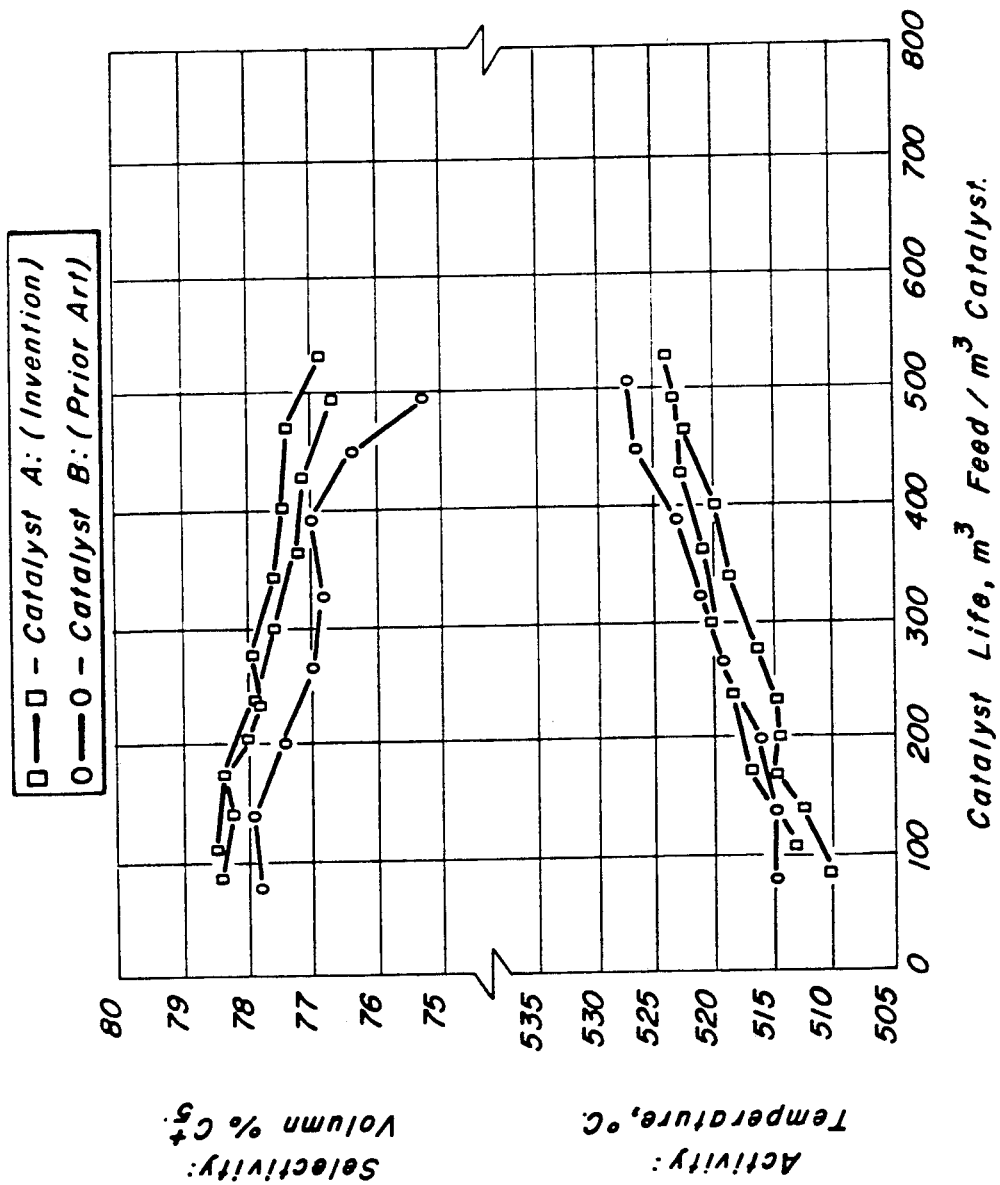

Comparative selectivities and activities are shown in FIG. 2. Selectivity is expressed as volume % yield of $C_5+$ product. Activity is expressed as the temperature requirement to produce a 98 RON clear product. The catalyst of the invention demonstrated an average selectivity advantage of about 0.6% and an activity advantage of about 3° C. over the catalyst of the prior art.

EXAMPLE V

An extruded catalyst having a diameter of about 1.6 mm was prepared in order to further exemplify the catalyst of the present invention and designated as Catalyst C. Substantially pure pseudoboehmite powder was charged to a continuous mixer in the amount of 1000 grams along with 723 grams of a solution of hydrogen chloride, stannic chloride and aluminum chloride. The resulting dough had a moisture content of about 57%. The dough was mixed for 10 minutes and extruded through a 1/16" die to form cylindrical extrudates. The extrudates were dried, calcined, subjected to platinum impregnation and chloride adjustment, oxidized and reduced in the manner of Catalyst A to yield a catalyst having the following approximate composition in mass %:

| | | |
|---|---|---|
| | Tin | 0.227 |
| | Platinum | 0.356 |
| | Chlorine | 1.06 |
| | Alumina | Balance |

EXAMPLE VI

A control catalyst having a diameter of about 1.6 mm was prepared in order to contrast the prior art with the present invention and designated as Catalyst D. Substantially pure pseudoboehmite powder was charged to a continuous mixer in the amount of 1000 grams along with 670 grams of a solution of nitric acid and stannic chloride. The formation of a precipitate of stannic oxide prior to mixing was noted. The resulting dough had a moisture content of about 57%. The dough was mixed for 10 minutes and extruded through a 1/16" die to form cylindrical extrudates. The extrudates were dried, calcined, subjected to platinum impregnation and chloride adjustment, oxidized and reduced in the manner of Catalyst A to yield a catalyst having the following approximate composition in mass %:

| | | |
|---|---|---|
| | Tin | 0.22 |
| | Platinum | 0.36 |
| | Chlorine | 1.02 |
| | Alumina | Balance |

EXAMPLE VII

The 1.6 mm catalysts of the invention and of the prior art, respectively, were examined by STEM to determine the extent of dispersion of the tin and platinum components. The catalysts were ground and a carbon-coated copper grid prewet with isopropanol was dipped in the powder, allowed to dry and inserted into the VG-HB-5 dedicated STEM. Results were as follows:

| | Catalyst C Invention | Catalyst D Prior Art |
|---|---|---|
| Tin: | | |
| Number of readings | 17 | 12 |
| Mean, mass % | 0.22 | 0.24 |
| Standard deviation | 0.04 | 0.07 |
| Platinum: | | |
| Number of readings | 17 | 12 |
| Mean, mass % | 0.42 | 0.39 |
| Standard deviation, mass % | 0.10 | 0.14 |

Figure 3:
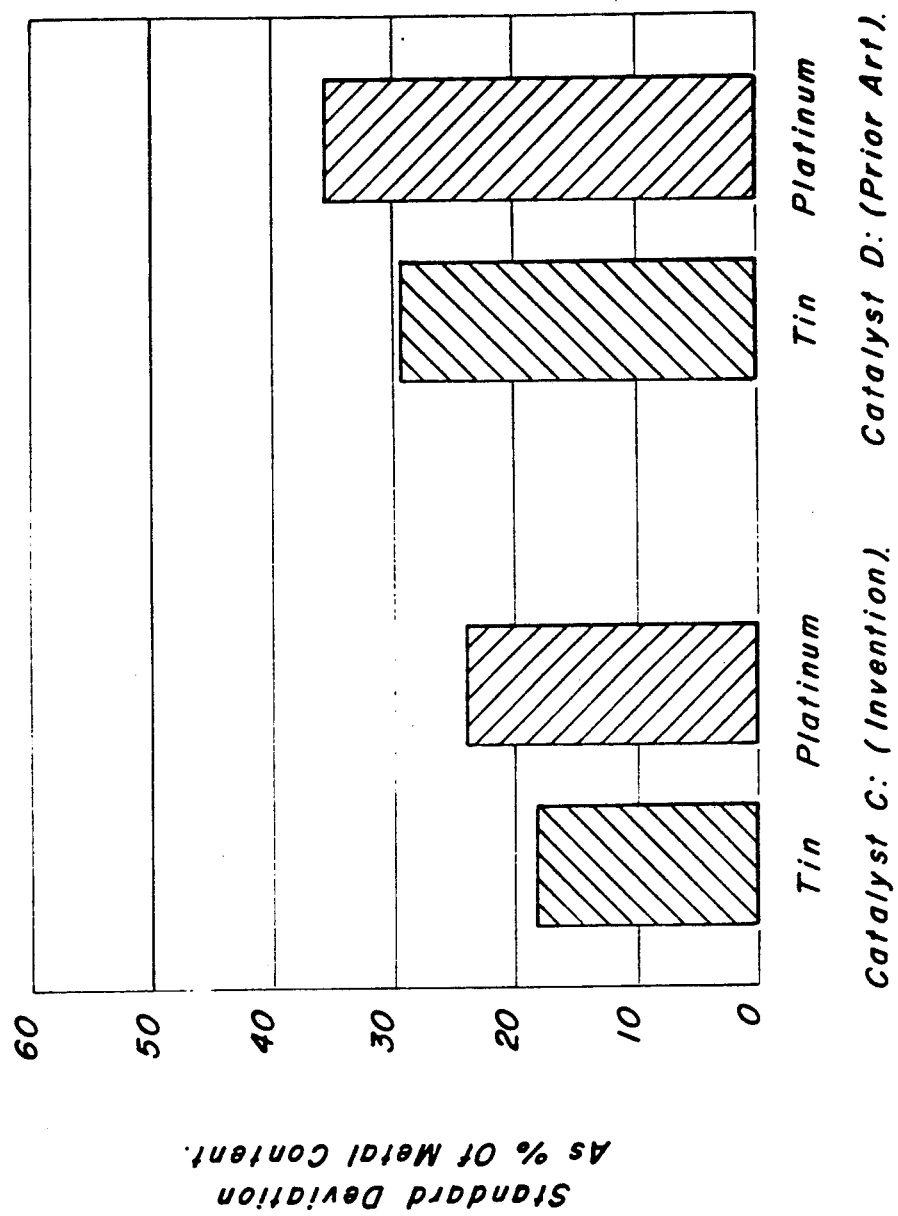

The comparative results are illustrated in FIG. 3.

EXAMPLE VIII

Pilot-plant tests were structured to compare the selectivity and activity of Catalysts C and D of the invention and of the prior art in a reforming process. The feedstock for the comparative tests was a hydrotreated petroleum-derived naphtha having the same characteristics as in Example IV. Each test was based on a severity of 98 RON (Research Octane Number) clear $C_5+$ product at a pressure of 17 atmospheres (ga) and a liquid hourly space velocity of 2.5 $hr^{-1}$.

Comparative selectivities and activities are shown in FIG. 4. Selectivity is expressed as volume % yield of $C_5+$ product. Activity is expressed as the temperature requirement to produce a 98 RON clear product. The catalyst of the invention demonstrated a selectivity advantage of about 0.4 to 0.5% over the catalyst of the prior art. Activities of the two catalysts were comparable within reproducibility limits.

EXAMPLE IX

Two catalysts were prepared to determine the effect of the homogeneity of germanium dispersion on catalyst performance.

Catalyst E was prepared commencing with the combination of substantially pure pseudoboehmite powder in a continuous mixer in the amount of 1000 grams with 670 grams of a solution of hydrogen chloride, germanium chloride and aluminum chloride. The formation of a precipitate of germanium oxide prior to mixing was noted. The resulting dough had a moisture content of about 57%. The dough was mixed for 10 minutes and extruded through a 1/12" die to form cylindrical extrudates. The extrudates were dried, calcined, subjected to platinum impregnation and chloride adjustment, oxidized and reduced in the manner of Catalyst A to yield a catalyst having the following approximate composition in mass %.

| | | |
|---|---|---|
| | Germanium | 0.24 |
| | Platinum | 0.37 |
| | Chlorine | 0.98 |
| | Alumina | Balance |

Catalyst F was prepared commencing with the combination of substantially pure pseudoboehmite powder in a continuous mixer in the amount of 1000 grams with 670 grams of a solution of nitric acid and germanium chloride. The resulting dough had a moisture content of about 57%. The dough was mixed for 10 minutes and extruded through a 1/12" die to form cylindrical extrudates. The extrudates were dried, calcined, subjected to platinum impregnation and chloride adjustment, oxidized and reduced in the manner of Catalyst A to yield a catalyst having the following approximate composition in mass %.

| | | |
|---|---|---|
| | Germanium | 0.24 |
| | Platinum | 0.37 |
| | Chlorine | 0.98 |
| | Alumina | Balance |

EXAMPLE X

The 2.1 mm Catalysts F and E of the invention and of the prior art, respectively, were examined by STEM to determine the extent of dispersion of the tin and platinum components. The catalysts were ground and a carboncoated copper grid prewet with isopropanol was dipped in the powder, allowed to dry and inserted into the VG-HB-5 dedicated STEM. Results were as follows:

| | Catalyst E | Catalyst F |
|---|---|---|
| Germanium: | | |
| Number of readings | 15 | 14 |
| Mean, mass % | 0.255 | 0.21 |

-continued

|  | Catalyst E | Catalyst F |
|---|---|---|
| Standard deviation | 0.06 | 0.03 |
| Platinum: | | |
| Number of readings | 15 | 14 |
| Mean, mass % | 0.34 | 0.29 |
| Standard deviation, mass % | 0.13 | 0.10 |

EXAMPLE XI

Pilot-plant tests were structured to compare the selectivity and activity of Catalysts E and F in a reforming process. The feedstock for the comparative tests was a hydrotreated petroleum-derived naphtha having the same characteristics as in Example IV. Each test was based on a severity of 98 RON (Research Octane Number) clear $C_5+$ product at a pressure of 17 atmospheres (ga) and a liquid hourly space velocity of 2.5 $hr^{-1}$.

Relative selectivity, activity and stability are compared below. Selectivity is expressed as volume % yield of $C_5+$ product. Activity is expressed as the temperature requirement to produce a 98 RON clear product. Stability is expressed as the required increase in temperature requirement per volume of the feed. Results are:

|  | Catalyst E | Catalyst F |
|---|---|---|
| Standard deviation of Ge. % | 24 | 14 |
| Selectivity, Vol. %, $C_5+$ | base | base + 0.9% |
| Activity, °C. | base | base − 7° C. |
| Stability, °C./Vol | base | 0.7 base |

Catalyst F, having germanium more homogeneously dispersed than in Catalyst E, is superior in selectivity, activity and stability.

We claim:

1. A bed of catalyst particles comprising a combination of alumina with about 0.1 to 10 mass % on an elemental basis of a chlorine component, about 0.01 to 2 mass % on an elemental basis of a platinum component, and about 0.1 to 2 mass % on an elemental basis of a tin component, the alumina and the tin component being coextruded, wherein the standard deviation of the local concentration of tin is less than about 25% of the bulk concentration of tin.

* * * * *